Dec. 31, 1929. O. J. NITARDY 1,741,248
WIND MOTOR
Filed March 19, 1928
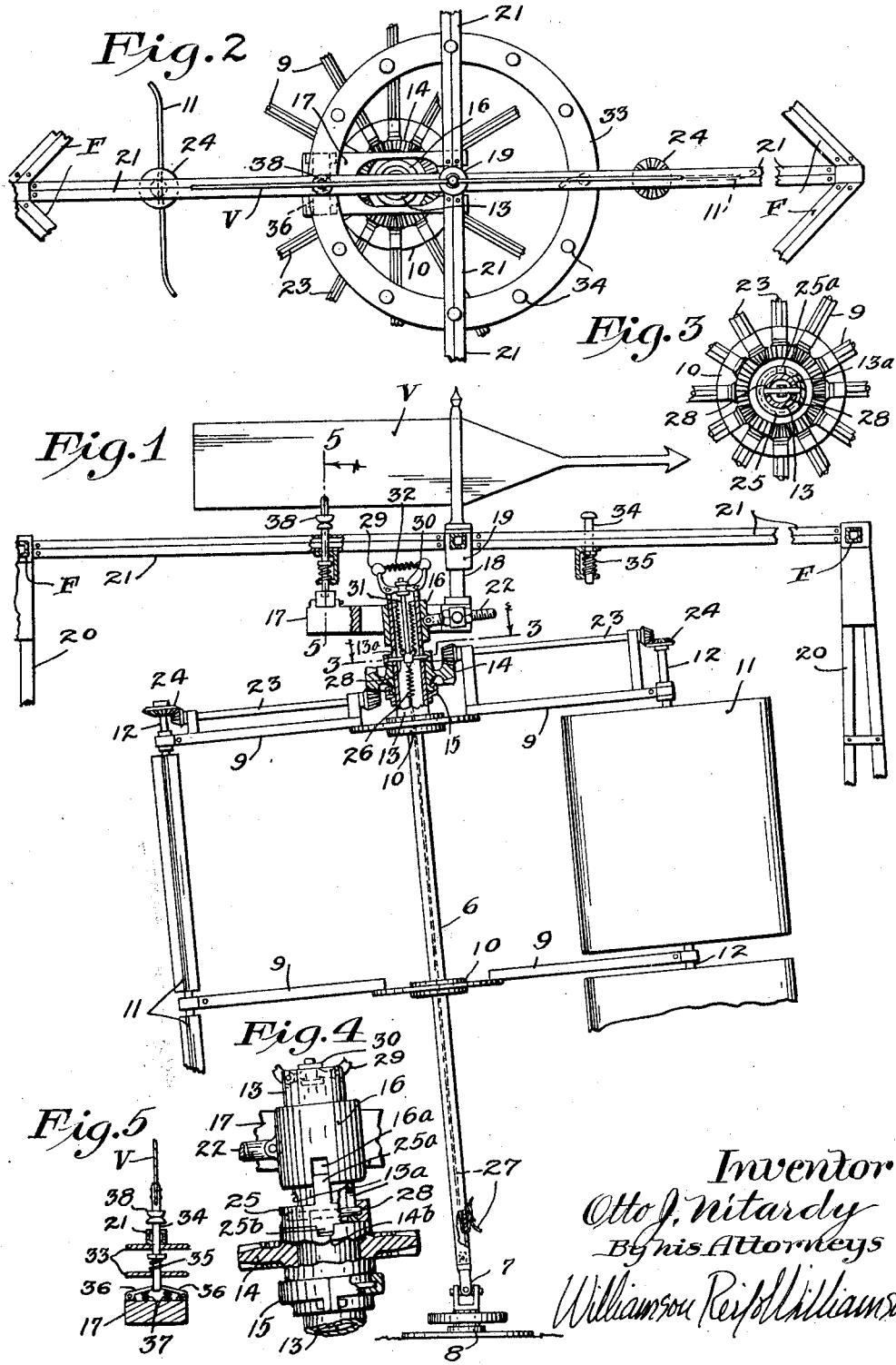
Inventor
Otto J. Nitardy
By his Attorneys
Williamson Reifl Williamson Patented Dec. 31, 1929

1,741,248

UNITED STATES PATENT OFFICE

OTTO J. NITARDY, OF MINNEAPOLIS, MINNESOTA

WIND MOTOR

Application filed March 19, 1928. Serial No. 262,644.

This invention relates to wind motors and particularly to the general type of wind motor described in my Patent No. 1,651,067, issued November 29th, 1927, and also in my pending application for patent Serial Number 259,247, entitled "Wind motor," filed March 5, 1928.

It is an object of this invention to provide a wind motor of the type disclosed in my above identified patent and application, wherein the wings are feathered in such manner as to expose them to the wind at the angle of greatest efficiency throughout their respective orbits and to include novel and highly efficient means for controlling the angulations of the wings to properly conform with the change of direction of the wind.

A further object is to provide in a wind motor of the type described mechanism functioning independently of vanes for causing the several wings to be held for proper action by the wind, said mechanism controlling the position of a master gear with which the several wings are drivably connected in such manner that they rotate through one-half a revolution throughout a single revolution of the rotor upon which they are mounted.

A still further object is to provide in a wind motor of the class described, means for maintaining said master gear in a fixed position throughout slight fluctuations of wind current said means being released upon the change in the direction of the wind.

Another object is to provide a wind motor of the type described, having efficient governing means for breaking the engagement between the master gear and the several rotary wings, whereby the rotor will be held against the wind until the wind attains a predetermined velocity and thereafter will be permitted to swing away from the wind.

These and other objects and advantages of the invention will be apparent from the following description made in connection with the accompanying drawings wherein like reference characters refer to similar parts throughout the several views and in which:

Fig. 1 is a side elevation illustrating an embodiment of the invention, some portions being broken away and others shown in section;

Fig. 2 is a plan view of the same;

Fig. 3 is a cross section taken on the line 3—3 of Fig. 1;

Fig. 4 is a fragmentary elevation with some parts broken away, showing the interlocking means between the governing mechanism and the master gear for controlling the feathering of the wings; and Fig. 5 is a vertical section taken on the line 5—5 of Fig. 1, showing the releasable retaining means for preventing slight oscillation of the master gear due to wind currents.

As illustrated in the drawings, a rotor is provided having its axis disposed at a slight angle to the vertical. As shown, my rotor may comprise a shaft 6 connected by a universal joint 7 at its lower end to a pivot plate 8 mounted for revolution on a vertical axis and said shaft having rigidly secured thereto two or more series of radially extending arms 9. As shown, arms 9 are rigidly attached at their inner ends to hubs 10 fixed to shaft 6. Mounted on a rotor between the several series of radial arms 9 are one or more series of wings 11, each wing being mounted for rotation on a substantially vertical axis and as shown, being fixed to the wing shafts 12, the upper ends of said shafts projecting above the upper series of arms 9. Rotor shaft 6 is preferably of tubular construction and has an enlarged upper end 13 upon which a master beveled gear 14 for controlling the feathering of the blades is loosely disposed. Master gear 14 is held against longitudinal movement on the sleeve 13 by means of a suitable flanged collar 15 fixed to said sleeve. The upper end of the rotor shaft is journaled in a suitable bearing 16, said bearing being adjustably carried by a horizontal arm 17, which is pivotally mounted at its inner end by means of a vertical shaft 18 journaled in a bearing 19 disposed centrally of a scaffold or frame structure supported from the ground. This frame structure may comprise a plurality of widely spaced vertical legs 20 having a horizontal rectangular top frame F supported thereby, said top frame including diagonally disposed intersecting beams 21 carrying at their point of intersection the vertical bearing 19. Bearing 19 is vertically alined with the pivot 8 and as clearly shown in Figs. 1 and 2, bearing 16 for the upper end of the rotor shaft is eccentrically disposed relatively to the vertical shaft 18. Bearing 16 may be adjusted within a relatively large slotted portion of the arm 17 by means of a suitable threaded bolt 22.

The master gear 14 is connected for slowly rotating wings 11 as the rotor revolves by means of a plurality of radially extending shafts 23 having beveled gear engagement at their inner ends with said master gear and having beveled gear engagement at their outer ends with beveled gears 24 fixed to the upper extremities of the wing shafts 12. As shown in Figs. 1 and 3, in order that the beveled gears for the inner ends of radial shafts 23 may be accommodated for meshing with master gear 14. Shafts 23 are alternately disposed above and below said master gear, while the beveled gears 24 on wing shafts 12 are correspondingly disposed to cause rotation of the wings in the proper direction. For every revolution of the rotor on shafts 6, wings 11 are rotated through one-half a complete revolution and the wings are so disposed in angulation that they may be successively exposed to the wind at the angle of greatest efficiency throughout the revolution of the rotor.

Master gear 14 when the wind is steady is maintained in substantially a fixed position, the movement of the rotor causing shafts 23 to revolve.

Master gear 14 is normally fixed to sleeve 13 by means of a clutch collar 25 slidably mounted on sleeve 13 between bearing 16 and the master gear. Clutch collar 25 carries dogs or other suitable clutch elements 25ª at its upper end slidably disposed in recessed portions 16ª of the bearing 16 and at its lower end carries relatively short dogs or clutch elements 25ᵇ adapted to engage notches 14ᵇ in the upper end of master gear 14. Collar 25 is normally held in its extreme downward position by means of a suitable coiled spring or other elastic element 26, the lower end of which is adjustably anchored by means of a cable or flexible member 27 passing longitudinally through the tubular rotor shaft 6 and secured at its inner end to a cleat or other retaining member adjacent the lower extremity of said shaft. Collar 25 is controlled by means of pins 28 which extend diametrically through the intermediate portion of sleeve 13 working through suitable oppositely alined slots 13ª provided, said pins projecting exteriorly of sleeve 13 and into recessed portions of collar 25. A governor mechanism of any desirable type is mounted at the upper end of sleeve 13 and is operatively connected with pin 28. As shown, the governing mechanism comprises a pair of the usual fly ball levers 29 pivotally connected to the upper end of sleeve 13 and having their shorter or working ends engaging a suitable spool 30 fixed to the upper end of a short shaft 31 which is housed in sleeve 13 and has its lower end connected to pin 28. Fly ball levers 29 have interposed therebetween an elastic element 32 and if desired balance springs may be interposed between the pin 28 and the upper end of sleeve 13.

As illustrated, an annular channel is supported from the under side of cross members 21 of the top frame F, said channel being concentric with bearing 19; circumferentially arranged on said channel circle 33 I mount a plurality of vertically disposed bolts 34 having rounded contact ends and yieldingly held in elevated position by means of suitable means, such as small coiled springs 35 interposed between one flange of ring 33 and suitable abutments or collars fixed to bolts 34. As shown in Figs. 1 and 5, a special detent is provided on the outer position of eccentric arm 17, said detent adapted to be interlocked with any one of said bolts. As shown, this detent comprises a pair of oppositely disposed hinged arms 36 pivoted on horizontal axes and suitably restricted in upward swinging movement to be normally maintained in oppositely inclined positions, resilient means, such as small coiled springs 37 being interposed between arms 36 and the upper surface of arm 17. When one of the bolts 34 are depressed the oscillation of arm 17 will in a short time cause the lower end of said bolt to be locked between the opposing ends of arms 36. I provide a comparatively small vane V fixed to the upwardly projecting end of shaft 18, which vane carries a depending striker member 38 at the lower edge of its wind area portion, said striker member being positioned the same distance from the shaft 18 as the several bolts 34.

*Operation*

The operation of my device may be briefly described as follows:—

It will be seen that the rotor shaft 6 is tilted in respect to the vertical, its upper end being eccentrically disposed relatively to the axis of shaft 18, said shaft being the pivot member for the eccentric arm 17, while the lower end of rotor shaft 6 is connected by universal joint to the pivot plate 8, the axes of pivot plate 8 and bearing 19 being coincident. Assuming the wind blowing in the direction indicated in Fig. 1, the arm 17 will be caused to swing from any position which it formerly assumed to the position shown in Fig. 1, the resistance of the wings 11 to the wind causing the arm 17 to be swung into substantial alinement with the wind. It will also be noticed that in this position a greater area of the wings are on the leeward side of the vertical axis of the shaft 18 than on the windward side thereof. The movement of arm 17 and with it of bearing 16 for the upper end of the rotor shaft causes master gear 14 to be turned through a corresponding arc, master gear 14, of course, in its movement changing the angulation of the various wings 11 of the rotor. The gyratory movement of rotor shaft 6 thus normal conditions determines the correct angulation of the wings 11, and it will be seen that no vanes are necessary in this device for producing this result.

It will be seen that as the rotor exceeds a predetermined speed fly ball levers 29 will cause disengagement between the clutch collar 25 and the master gear 14, thereby releasing master gear from bearing 16 and arm 17 and thereby causing the several wings of the rotor to be no longer held against the wind for efficient operation of the device.

Assuming the direction of the wind to be constant or substantially constant, vane V will be held in a certain position and will engage one of the bolts 34 depressing the same and causing the locking end of said bolt to engage the detent provided by oppositely disposed arms 36 carried by the eccentric arm 17. The master gear will thus be prevented from oscillating through slight variations in the air currents, but upon a change in the direction of the wind the bolt 34 will be released from engagement with striker member 38 carried by the vane and will spring upward causing disengagement and releasing eccentric arm 17 for proper movement to correctly position master gear 14 in such manner that all of the several wings 11 will be feathered properly to become exposed to the wind at the angle of greatest efficiency. The angle at which rotor shaft 6 is inclined may be varied by adjusting the bolt 22 which is secured to bearing 16 for the upper end of the rotor shaft.

From the foregoing description it will be seen that my present improvement greatly simplifies the construction of the type of wind motor described in my earlier Patent No. 1,651,067, issued November 29th, 1927 and in my earlier application for U. S. Letters Patent S. N. 259,247 entitled "Wind motor", filed March 5, 1928. No vanes are required for correctly positioning master gear 14 but the shaft of the rotor being tilted and journaled at its end in an ecentric bearing through its gyratory movement maintains the master gear at the correct position.

It will, of course, be understood that various changes may be made in the form, details, arrangement and proportions of the parts without departing from the scope of applicant's invention.

What is claimed is:

1. A wind motor comprising a rotor having a shaft inclined slightly from the vertical, the lower end of said shaft being connected with a vertical pivot member, the upper end of said shaft being rotatable in an eccentric mounting, said mounting having a vertical pivot axially alined with said first mentioned pivot member, a plurality of wings mounted on said rotor, for independent rotation on axes parallel to the axis of said rotor, means for feathering said wings, including a master gear normally fixed to said eccentric mounting, whereby a change in direction of the wind will cause said mounting to swing, changing the position of said master gear, and connections between said master gear and said wings for controlling the positions of said wings.

2. A wind motor comprising a rotor having a shaft inclined slightly from the vertical, a vertical pivot member connected by universal joint to the lower end of said rotor shaft, an eccentric mounting having a vertical pivot axially alined with said first mentioned pivot, the upper end of said rotor shaft being journaled in said mounting, a plurality of wings mounted on said rotor for independent rotation on axes parallel to the axis of said rotor, means for conjointly feathering said wings, including a master gear co-axial with said rotor, and connections between said master gear and said several wings, and means for normally fixing said master gear to said eccentric mounting and means for releasing said master gear therefrom when the wind exceeds a predetermined velocity.

3. A wind motor comprising a rotor having a shaft inclined slightly from the vertical, a vertical pivot member at the lower end of said shaft, a universal connection between said shaft and said pivot member, an eccentric mounting pivoted on a vertical axis axially alined with said first mentioned pivot member, a bearing in said mounting in which the upper end of said rotor shaft is journaled, a plurality of wings mounted on said rotor for independent rotation on axes parallel to the axis of said rotor, means for conjointly feathering said wings, including a master gear co-axial with said rotor, and connections between said master gear and said several wings, clutch mechanism for normally fixing said master gear to said bearing, and governing mechanism on said rotor for disconnecting said master gear when the wind exceeds a predetermined velocity.

4. A wind motor comprising a rotor having a shaft inclined slightly from the vertical, the lower end of said shaft being connected with a vertical pivot member, the upper end of said shaft being rotatable in an eccentric mounting, said mounting having a vertical pivot axially alined with said first mentioned pivot member, a plurality of wings mounted on said rotor for independent rotation on axes parallel to the axis of said rotor, means for feathering said wings, including a master gear normally fixed to said eccentric mounting, whereby a change in direction of the wind will cause said mounting to swing, changing the position of said master gear, connections between said master gear and said wings for controlling the positions of said wings, and means for preventing said eccentric mounting from oscillating due to small fluctuations in air currents.

5. A wind motor comprising a rotor having a shaft inclined slightly from the vertical, the lower end of said shaft being connected with a vertical pivot member, the upper end of said shaft being rotatable in an eccentric mounting, said mounting having a vertical pivot axially alined with said first mentioned pivot member, a plurality of wings mounted on said rotor for independent rotation on axes parallel to the axis of said rotor, means for feathering said wings, including a master gear normally fixed to said eccentric mounting, whereby a change in direction of the wind will cause said mounting to swing, changing the position of said master gear, connections between said master gear and said wings for controlling the positions of said wings, a stationary frame wherein the pivot for said eccentric mounting is journaled, means carried by said frame engageable with said mounting for arresting the movement of the same, and means controlled by the direction of the wind for actuating said first mentioned means to hold said mounting.

6. A wind motor comprising a rotor having a shaft inclined slightly from the vertical, the lower end of said shaft being connected with a vertical pivot member, the upper end of said shaft being rotatable in an eccentric mounting, said mounting having a vertical pivot axially alined with said first mentioned pivot member, a plurality of wings mounted on said rotor for independent rotation on axes parallel to the axis of said rotor, means for feathering said wings, including a master gear normally fixed to said eccentric mounting, whereby a change in direction of the wind will cause said mounting to swing, changing the position of said master gear, connections between said master gear and said wings for controlling the positions of the wings, a stationary frame having a portion overhanging said rotor, means carried by said frame for arresting the movement of said mounting, a vane mounted on a vertical axis, and means carried by said vane for actuating said first mentioned means.

7. A wind motor comprising a rotor having a shaft inclined slightly from the vertical, the lower end of said shaft being connected with a vertical pivot member, the upper end of said shaft being rotatable in an eccentric mounting, said mounting having a vertical pivot axially alined with said first mentioned pivot member, a plurality of wings mounted on said rotor for independent rotation on axes parallel to the axis of said rotor, means for feathering said wings, including a master gear normally fixed to said eccentric mounting, whereby a change in direction of the wind will cause said mounting to swing, changing the position of said master gear, connections between said master gear and said wings for controlling the positions of said wings, a stationary frame having a portion overhanging said rotor, a series of vertically slidable, circumferentially spaced bolts engageable with said eccentric arm when depressed, a vane co-axial with the pivot for said mounting, and means carried by said vane for engaging said bolts when said vane is alined therewith.

8. A wind motor comprising a rotor having a shaft inclined slightly from the vertical, one end of said shaft having a universal connection, the opposite end of said shaft being rotatable in an eccentric mounting, said mounting having a pivot vertically alined with said universal connection, a plurality of wings mounted on said rotor for independent movement thereon, means dependent upon the revolution of said rotor for independently moving said wings and a driving connection between said means and said eccentric mounting.

9. A wind motor comprising a rotor having a shaft inclined slightly from the vertical, one end of said shaft having a universal connection, an eccentric mounting having a vertical pivot, the axis of which passes through said universal connection, a bearing in said mounting in which the opposite end of said shaft is mounted, wings mounted on said rotor, means for changing the position of said wings relatively to said rotor during the revolution of said rotor including an oscillatory member rotatively mounted upon said shaft, connections between said oscillatory member and said eccentric mounting for varying the position of said oscillatory member with the variation of position of said oscillatory member.

10. A wind motor comprising a rotor having a shaft inclined slightly from the vertical, a vertical pivot member connected by universal connection joint to one end of said rotor shaft, an eccentric mounting having a vertical pivot axially alined with said first mentioned pivot, the other end of said rotor shaft being journaled in said mounting, a plurality of wings mounted on said rotor for independent rotation on axes parallel to the axis of said rotor, a master driving member loosely mounted on said shaft, driving connections between said master driving member and said several wings and driving connections between said eccentric mounting and said master driving element for oscillating said master element upon the oscillation of said mounting.

In testimony whereof I affix my signature.

OTTO J. NITARDY.